United States Patent
Kim et al.

(10) Patent No.: US 9,927,643 B2
(45) Date of Patent: Mar. 27, 2018

(54) LIQUID CRYSTAL DISPLAY DEVICE AND METHOD FOR MANUFACTURING THE SAME

(71) Applicant: LG DISPLAY CO., LTD., Seoul (KR)

(72) Inventors: KiWon Kim, Goyang-si (KR); KwangSeok Lee, Daegu (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 14/955,956

(22) Filed: Dec. 1, 2015

(65) Prior Publication Data
US 2016/0154271 A1    Jun. 2, 2016

(30) Foreign Application Priority Data
Dec. 1, 2014    (KR) .................. 10-2014-0169965

(51) Int. Cl.
| | | |
|---|---|---|
| G02F 1/1335 | (2006.01) | |
| G02F 1/1333 | (2006.01) | |
| G06F 1/16 | (2006.01) | |
| H04M 1/02 | (2006.01) | |

(52) U.S. Cl.
CPC .. *G02F 1/133308* (2013.01); *G02F 1/133528* (2013.01); *G06F 1/1626* (2013.01); *G06F 1/1637* (2013.01); *G06F 1/1643* (2013.01); *G02F 2001/133314* (2013.01); *G02F 2001/133317* (2013.01); *G02F 2001/133322* (2013.01); *G02F 2001/133325* (2013.01); *H04M 1/0266* (2013.01)

(58) Field of Classification Search
CPC ......... G02F 1/133308; G02F 1/133528; G06F 1/1367
See application file for complete search history.

(56) References Cited

U.S. PATENT DOCUMENTS

| | | | |
|---|---|---|---|
| 2007/0079537 A1 | 4/2007 | Lee | |
| 2011/0260960 A1* | 10/2011 | Jean | .................. H04N 5/64 345/102 |
| 2012/0013818 A1 | 1/2012 | Park et al. | |
| 2012/0086896 A1 | 4/2012 | Tanaka | |
| 2015/0268410 A1* | 9/2015 | Yu | .................. G02B 6/0083 349/58 |
| 2016/0154172 A1* | 6/2016 | Komano | .............. G02B 6/0055 349/65 |

FOREIGN PATENT DOCUMENTS

KR    10-2014-0048702 A    4/2014

* cited by examiner

*Primary Examiner* — James Dudek
(74) *Attorney, Agent, or Firm* — Birch, Stewart, Kolasch & Birch, LLP

(57) ABSTRACT

A narrow bezel-type liquid crystal display device is provided which is made as narrow as possible on the outer area. The narrow bezel-type liquid crystal display device according to an embodiment includes a guide panel with a light leak prevention function. This narrow bezel-type liquid crystal display device can reduce light leakage in a non-display area because the guide panel corresponding to a non-display area of the liquid crystal panel is made in black by double injection molding.

16 Claims, 8 Drawing Sheets

LIQUID CRYSTAL DISPLAY DEVICE AND METHOD FOR MANUFACTURING THE SAME

CROSS-REFERENCE TO RELATED APPLICATION

Pursuant to 35 U.S.C. § 119(a), this application claims the benefit of earlier filing date and right of priority to Korean Application No. 10-2014-0169965, filed on Dec. 1, 2014, the contents of which is incorporated by reference herein in its entirety.

BACKGROUND

Field of the Technology

The present disclosure relates to a liquid crystal display device, and more particularly, to a narrow bezel-type liquid crystal display device, and a method for manufacturing the same.

Description of the Related Art

Display devices are widely used as electronic information devices in a variety of electronic devices, such as mobile phones, laptops, HDTVs, and so on that provide high-resolution and high-quality images.

Active research has been performed on various display devices, including LCDs (liquid crystal displays), PDPs (plasma display panels), FEDs (field emission displays), OLEDs (organic light emitting diodes), and the like. Among these devices, the LCDs are currently getting a lot of attention for their mass production technology, ease of operation, high picture quality, and large-sized screen.

The above-mentioned liquid crystal displays are non-emissive and transmissive display devices. A liquid crystal panel is made by bonding two substrates together, with liquid crystal molecules interposed between them, and the amount of light passing through the liquid crystal layer is adjusted due to the anisotropy in the refractive index of the liquid crystal layer, thereby displaying a desired image on the screen. Accordingly, a typical liquid crystal display device has a liquid crystal panel and a backlight unit for illuminating the liquid crystal panel.

The liquid crystal panel and the backlight unit are attached to a structure, such as a guide panel and a cover bottom, for maintaining rigidity against external force and supporting the back.

Generally the bezel area of liquid crystal displays tends to be made as narrow as possible. In view of this, there was suggested a structure in which the guide panel, which conventionally supports the liquid crystal panel, is mounted inside the cover bottom, and the liquid crystal panel is supported by the side of the cover bottom instead of by the guide panel.

SUMMARY

An exemplary embodiment of the present disclosure provides a liquid crystal display device including: a liquid crystal panel; a backlight unit located under the rear side of the liquid crystal panel; and a mounting structure comprising a cover bottom supporting the liquid crystal panel and a guide panel mounted inside the cover bottom.

In one embodiment, the guide panel includes a first injection-molded portion provided between the inner side and bottom of the cover bottom; and a second portion connected to the first portion and supporting the liquid crystal panel on at least one side of the cover bottom. Preferably, the first and/or second portion is formed by injection molding.

According to a further exemplary embodiment, a method for manufacturing a liquid crystal display device as described above is provided. The method may include forming a cover bottom having a bottom surface and side surfaces; forming a guide panel including a first portion within the cover bottom and a second portion connected to the first portion and extending over a part of the side surfaces of the cover bottom; and mounting a liquid crystal panel including a display area and a non-display area, wherein at least part of the non-display area of the liquid crystal panel is supported by the second portion of the guide panel. Preferably, the first portion of the guide panel is formed by injecting resin through injection holes in the bottom surface of the cover bottom in a first step of a double injection molding process. The second portion of the guide panel may be formed by injecting black resin in a second step of the double injection molding process.

According to the exemplary embodiment of the present disclosure, this narrow bezel-type liquid crystal display device can reduce light leakage in a non-display area because of the guide panel corresponding to a non-display area of the liquid crystal panel. Preferably, the guide panel is made to be black or some other color that can block light. Preferably, the guide panel is formed by means of double injection molding.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE EMBODIMENTS

Figure 1:
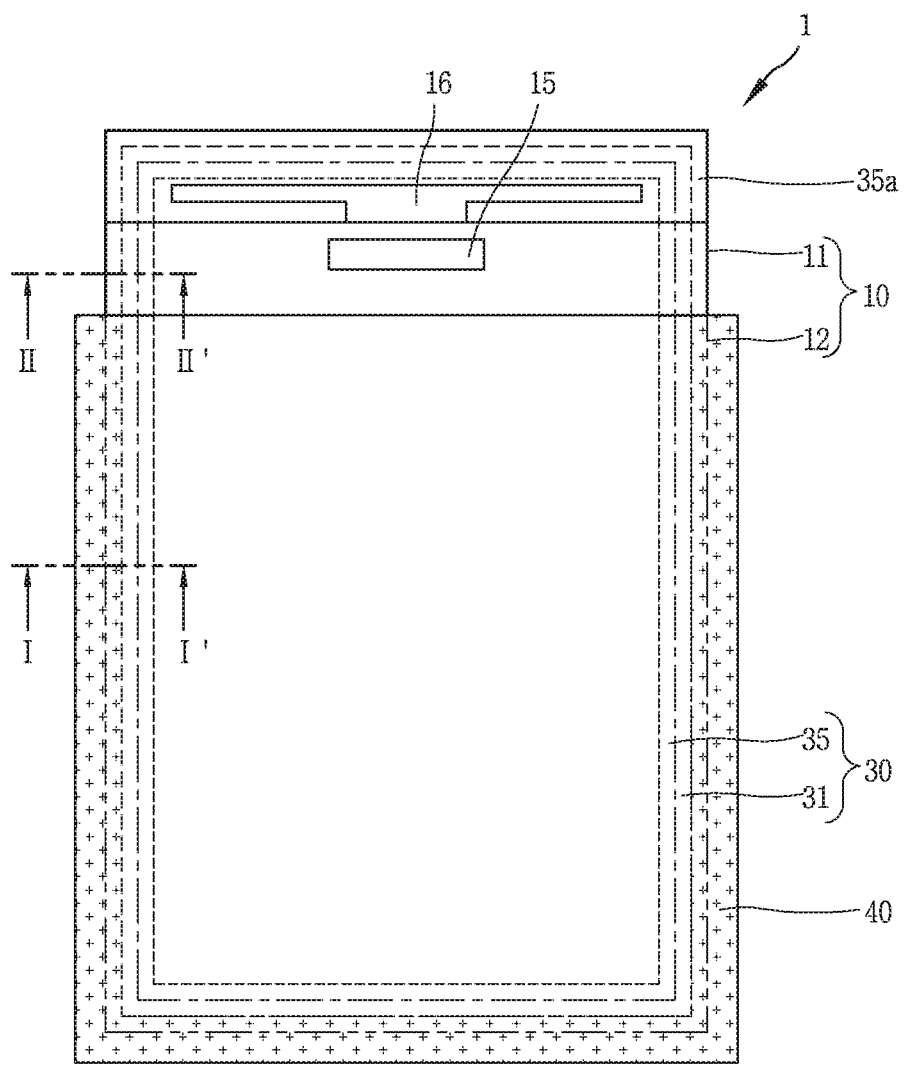
FIG. 1 is a top plan view of a liquid crystal display device having a narrow bezel structure according to an exemplary embodiment.

Advantages and features of the present inventive concepts and methods of accomplishing the same may be understood more readily by reference to the following detailed description of illustrated embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the scope of the inventive concept to those skilled in the art. Like reference numerals refer to like elements throughout the specification.

The shapes, dimensions, proportions, angles, figures, numbers, etc disclosed in the drawings to describe the embodiments of the present disclosure are merely examples and the present invention is not limited thereto. Particularly, the dimensions and proportions of the main elements of the present disclosure are magnified compared to other elements for easy identification of their shapes.

When it is deemed that certain detailed descriptions of related well-known technology may unnecessarily obscure the gist of the invention, such detailed description thereof will be omitted.

The terms 'include', 'comprise', 'have', and 'consist of' are intended to mean that the parts may include additional sub-parts unless the term "only" is stated. As used herein, the terms "a," "an," and "the" are to be understood as meaning both singular and plural, unless explicitly stated otherwise.

Although not explicitly stated, the elements may be interpreted to have or take into consideration a margin of error or tolerance.

When the positional relation between two parts is described using the terms 'on', 'above', 'below', 'next', and the like, one or more parts may be positioned between the two parts as long as the term 'immediately' or 'directly' is not used.

It will be understood that, although the terms 'after', 'followed by', 'following', 'before', and so on may be used herein, theses terms are not intended to limit chronological orders unless the term 'immediately' or 'right' is not stated.

While terms such as 'first', 'second', etc. may be used to describe various components, such components must not be understood as being limited to the above terms. The above terms are used only to distinguish one component from another. For example, a first component may be referred to as a second component without departing from the scope of rights of the present disclosure.

The components of various embodiments of the present disclosure can be partially or entirely bonded to or combined with each other and can be interlocked and operated in technically various ways as can be fully understood by an ordinary person skilled in the art, and the embodiments can be carried out independently of or in association with each other.

Hereinafter, a liquid crystal display device including a guide panel according to an exemplary embodiment of the present disclosure will be described in detail with reference to the accompanying drawings.

FIG. 1 is a top plan view of a liquid crystal display device having a narrow bezel structure according to an exemplary embodiment.

Referring to FIG. 1, the related art liquid crystal display device 1 having the narrow bezel structure includes a liquid crystal panel 10 and a cover bottom 31 where the liquid crystal panel 10 is seated.

The cover bottom 31 may have a box-shape or cuboid shape with one open surface. Thus, the cover bottom 31 may have a bottom surface and four side surfaces. A guide panel 35 is provided inside of the cover bottom 31 and includes a projection 35a extending over a portion of the side surfaces of the cover bottom 31. Thus, a mounting structure 30 including the cover bottom 31 and the guide panel 35 is formed.

The liquid crystal panel 10 is formed by joining together a lower substrate 11 and an upper substrate 12 of different widths, and a lower polarizer is bonded to the rear side of the lower substrate 11. The liquid crystal panel 10 is attached to the cover bottom 31 in such a way that it is seated on top of the side surfaces of the cover bottom 31.

In the liquid crystal display device 1 having this structure, an upper polarizer 14 bonded to the liquid crystal panel 10 is wider than three sides of the upper substrate 12. By applying a particular adhesive 40 to the remaining space of the upper polarizer 14, the liquid crystal panel 10 and the cover bottom 31 are joined together, thereby blocking the inside of the liquid crystal display device 1 from the outside.

However, in the structure of the liquid crystal panel 10, the lower substrate 11 is made longer than the upper substrate 12. One edge of the lower substrate 11 may form a non-display area, where a driving IC 15 and a flexible substrate 16 are connected. As such, the upper polarizer 14 is not present in the non-display area of the lower substrate 11. Accordingly, the non-display area of the lower substrate 11 is not attached to the cover bottom 31 by the adhesive 40.

Figure 2A:
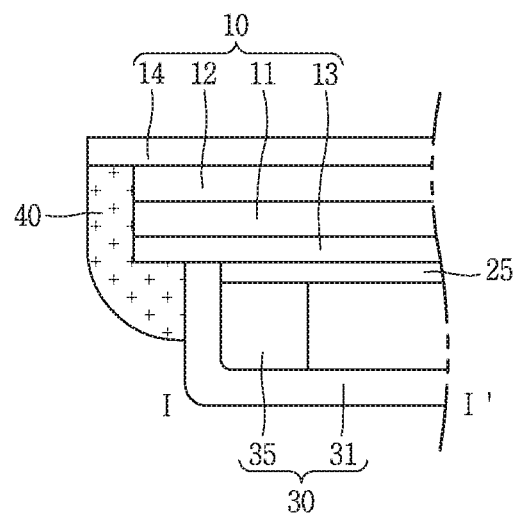
FIGS. 2A and 2B are cross-sectional views taken along the lines I-I and II-II' of FIG. 1, respectively.
Figure 2B:
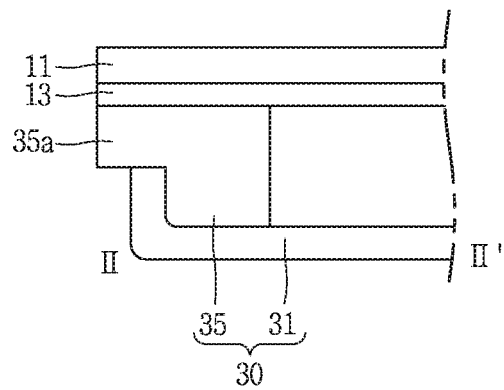

FIGS. 2A and 2B are cross-sectional views taken along the lines I-I and II-II' of FIG. 1.

Referring to FIGS. 2A and 2B, a part of a rear side of an edge corresponding to a display area of the liquid crystal panel 10 is supported by a side surface of the cover bottom 31. A guide panel 35 for supporting an optical sheet 25, i.e., a component of the backlight unit, is mounted inside the cover bottom 31.

In this case, the liquid crystal panel 10 includes the lower and upper substrates 11 and 12, with the lower polarizer 13 bonded to the rear side of the lower substrate 11 and the upper polarizer 14 bonded to the front of the upper substrate 12. The upper polarizer 14 is secured to the side surfaces of the cover bottom 31 by the adhesive 40 because it is wider than the lower and upper substrates 11 and 12 (see the part of line I-I).

A part of a rear side of an edge corresponding to the non-display area of the liquid crystal panel 10 is supported by a projection 35a extending from the guide panel 35 and protruding from the sidewall of the cover bottom 31. Here, the upper substrate 12 and the upper polarizer 14 may not be present above the projection 35a.

In this structure, the adhesive 40 configured to light shield light emission from a light source in the liquid crystal display device. However, among portions of the non-display area where the adhesive 40 is not applied, light may undesirably leak out and cause defects.

Figure 3:
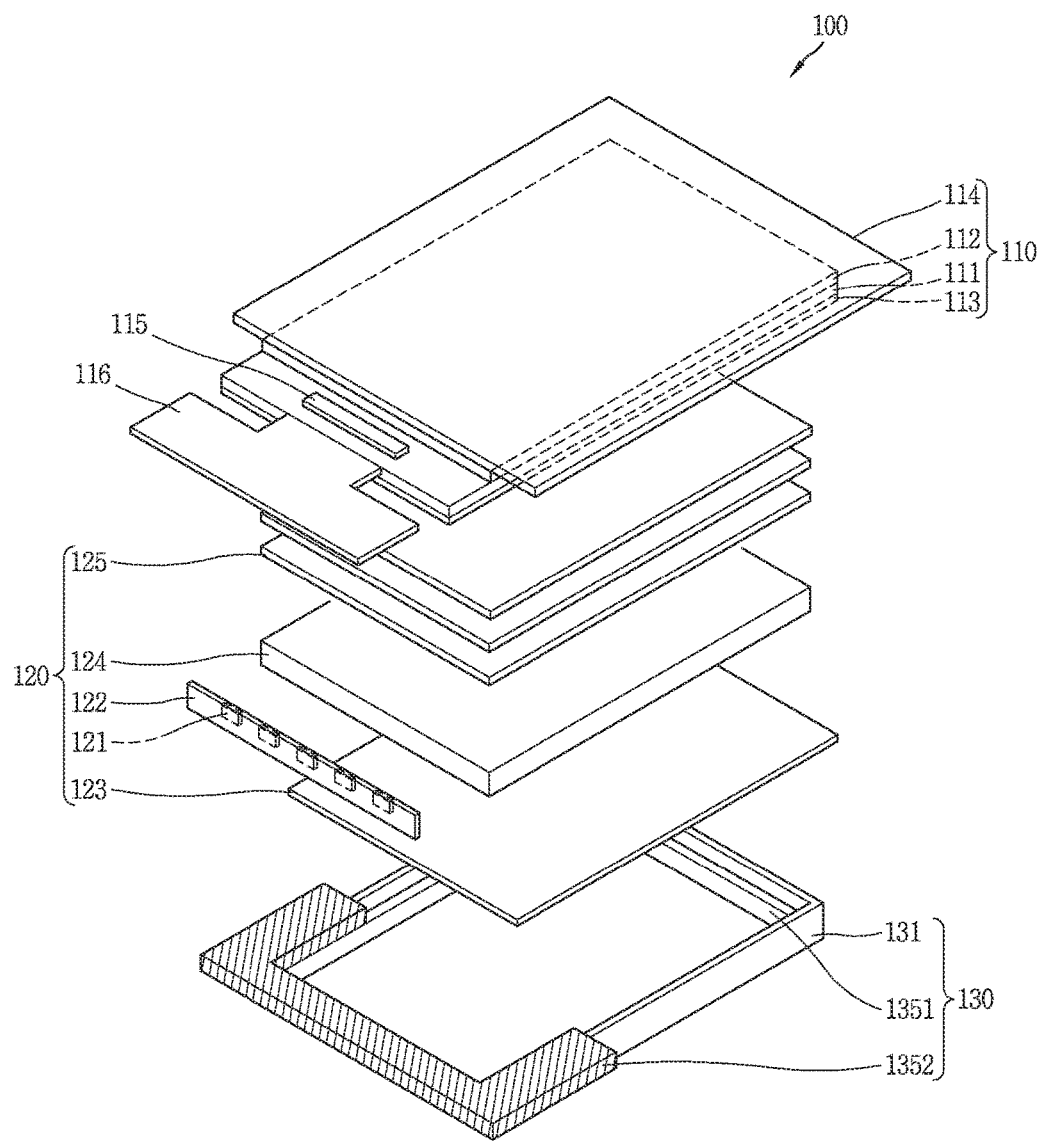
FIG. 3 is an exploded perspective view showing the entire structure of a liquid crystal display device according to another embodiment of the present invention.
Figure 4:
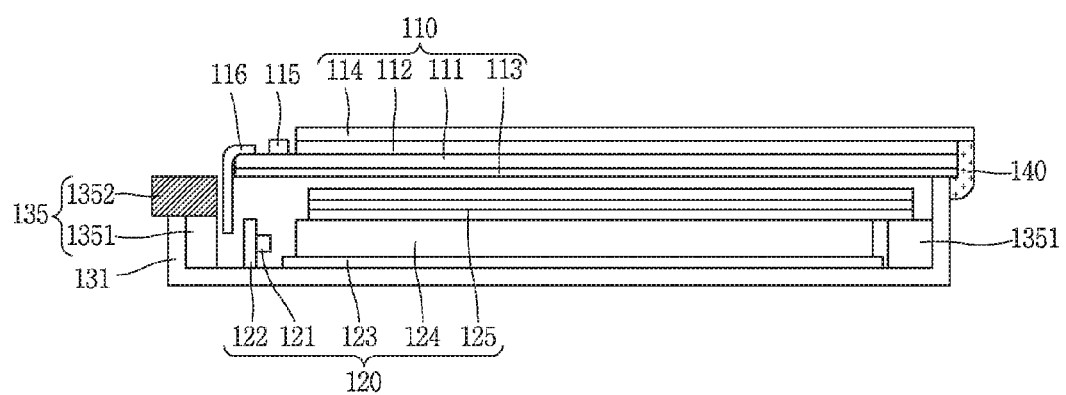
FIG. 4 is a cross-sectional view of an assembled liquid crystal display device according to the present invention.

FIG. 3 is an exploded perspective view showing the entire structure of a liquid crystal display device according to another exemplary embodiment of the present disclosure. FIG. 4 is a cross-sectional view of an assembled liquid crystal display device according to an embodiment of the present disclosure.

Referring to FIGS. 3 and 4, a liquid crystal display device according to an embodiment of the present disclosure includes a liquid crystal panel 110, a backlight unit 120 located beneath the rear side of the liquid crystal panel 110, and a mounting structure 130 for mounting the liquid crystal panel 110 and the backlight unit 120, the mounting structure 130 including a cover bottom 131 supporting the liquid crystal panel 110 and a guide panel 135 mounted inside or within the cover bottom 131. The guide panel 135 includes a first portion 1351 adjoining the inner side of the cover bottom 131 and a second portion 1352 connected to the first portion 1351 and protruding across at least one side edge of the cover bottom 131. The second portion 1352 may surround one of the side edges at a full length thereof and a portion of two side edges of the cover bottom 131. Thus, the second portion 1352 may cover up to three consecutive, i.e. neighboring or subsequent, side edges of the cover bottom 131 adjacent to a flexible substrate 116. All the components of the liquid crystal display device according to all the embodiments of the present invention are operatively coupled and configured.

The liquid crystal panel 110 includes a lower substrate 111 and an upper substrate 112 joined together, spaced apart by a certain distance, with a liquid crystal layer interposed between them, while images can be displayed under the control of a driving IC 115 and other components. Thin film transistors used as switching elements, various signal lines, and pixel electrodes are formed on the lower substrate 111. Color filters and a black matrix are formed on the upper substrate 112 to implement the displaying of at least three primary colors R, G, and B. The liquid crystal panel 110 may be divided into a display area and a non-display area, i.e. depending on whether they are involved in displaying images or not. In the non-display area, the IC 115 may be disposed, and/or a flexible substrate 116 may be connected for connection to an external device.

On the lower substrate 111 of the liquid crystal panel 110, in contrast to the upper substrate 112, the driving IC 115 is mounted in the non-display area, which is an extension to one side edge, and a flexible substrate 116 is connected thereto.

The driving IC 115 generates various types of control signals for driving the thin film transistors and applies them to the signal lines on the liquid crystal panel 110. The flexible substrate 116 is connected to an external system to transmit a data signal associated with an image and a timing signal for synchronization, and receives power for driving operations.

The lower substrate 111 and upper substrate 112 thus constructed are joined together with a sealant provided adjacent to the four side edges of each substrate. A lower polarizer 113 and an upper polarizer 114 are bonded to the rear side of the lower substrate and the front of the upper substrate 112, respectively, to polarize the light coming from the backlight unit 120 and the light exiting the liquid crystal panel 110, thereby displaying an image.

Particularly, the upper polarizer 114 is wider than the upper substrate 112 and protrudes outward, in three directions, apart from the direction of the non-display area. In the protruding area, the components are held in place with the use of an adhesive 140 applied to the sides of the two substrates 111 and 112 and the side of the cover bottom 131 to be described later.

The backlight unit 120 includes an LED package 121 of a plurality of light sources arranged on one side edge of the rear side of the above-described liquid crystal panel 110 to emit light, a package substrate 122 where the LED package 121 is mounted, a reflective plate 123 for reflecting the light emitted to the rear side of the liquid crystal panel, a light guide plate 124 positioned corresponding to the rear side of the liquid crystal panel 110 and for guiding light emitted from the LED package 121 to the display area of the liquid crystal panel 110, and an optical sheet 125 provided between the liquid crystal panel 110 and the light guide plate 124 and for diffusing and focusing the light guided by the light guide plate 124.

The LED package 121 may be a combination of R, G, and B light emitting diode (LED) packages for emitting lights of R, G, and B, or may consist only of one type of LED package for emitting white light W.

The package substrate 122 is a bar shaped or strip-like printed circuit board (PCB), where a plurality of LED packages 121 are mounted in a row. The package substrate 122, along with the LED packages 121, constitute a single LED array, and is connected to an external power supply by a cable. The package substrate 122 is positioned to face a light incidence plane, along a side of the light guide plate 124.

Although the drawings illustrate an example where an LED array is used as an edge-lit backlight unit placed at one side of the light guide plate 124, an LED array used as a direct-lit backlight unit may be configured to correspond to the rear side of the liquid crystal panel 110, without using the light guide plate 124.

The reflective plate 123 is provided between the cover bottom 131 and the rear side of the light guide plate 124 to reflect downwardly-emitted light and directs it again toward the light guide plate 124.

The light guide plate 124 is for guiding the light diffusively emitted from the light guide plate 124 to the liquid crystal panel 110. The light incident on the incidence plane of the light guide plate 124 is transmitted by total internal reflection with the light guide plate 124, and directed upward according to a light emission pattern (scattering pattern).

The optical sheet 125 functions to enhance the efficiency of light emitted from the light guide plate 124 and allow the light to enter the liquid crystal panel 110. The optical sheet 125 may consist of (or include) a plurality of sheets: a diffusion sheet for diffusing light emitted from the light guide plate 124 and a plurality of prism sheets for focusing the light diffused by the diffusion sheet and uniformly distributing the light over the entire area of the liquid crystal panel 110.

Typically, the diffusion sheet may be a single sheet, and the prism sheets may consist of (or include) a first prism sheet and a second prism sheet which cross each other in directions of X and Y axes to enhance the straight propagation of light.

The liquid crystal panel 110 and backlight unit 120 constructed as above are integrated by the mounting structure 130 consisting of the cover bottom 131 and the guide panel 135 that are to be described later.

The cover bottom 131 is open at the upper part and closed at the four sides and the lower part. The reflective plate 123 may be placed over or rather within the cover bottom 131. Then the light guide plate 124 may be placed on the reflective plate 123. Particularly, the liquid crystal panel 110 is seated on three sides of the cover bottom 131 so that is supported. That is, the cover bottom 131 may be considered as consisting of a bottom surface and four side surfaces extending along a circumference of the bottom surface, so that the cover bottom 131 may have a (preferably rectangular) cuboid shape with one open surface. Thus, the liquid crystal panel 110 may be supported by end portions of three of the four side surfaces.

Figure 5A:
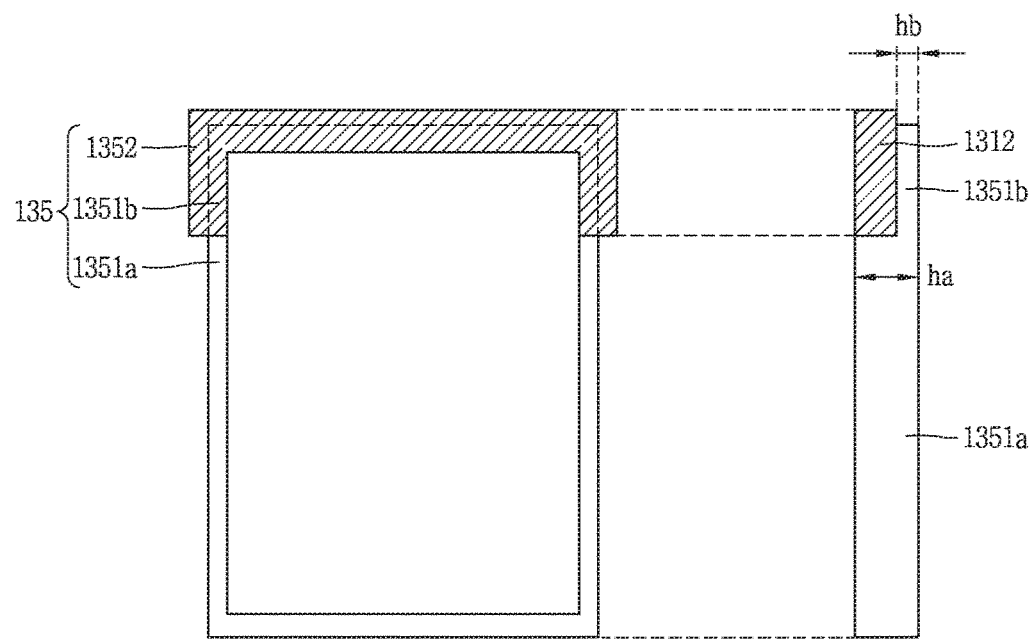
FIG. 5A illustrates a top plan view and side view of the guide panel of FIG. 3.
Figure 5B:
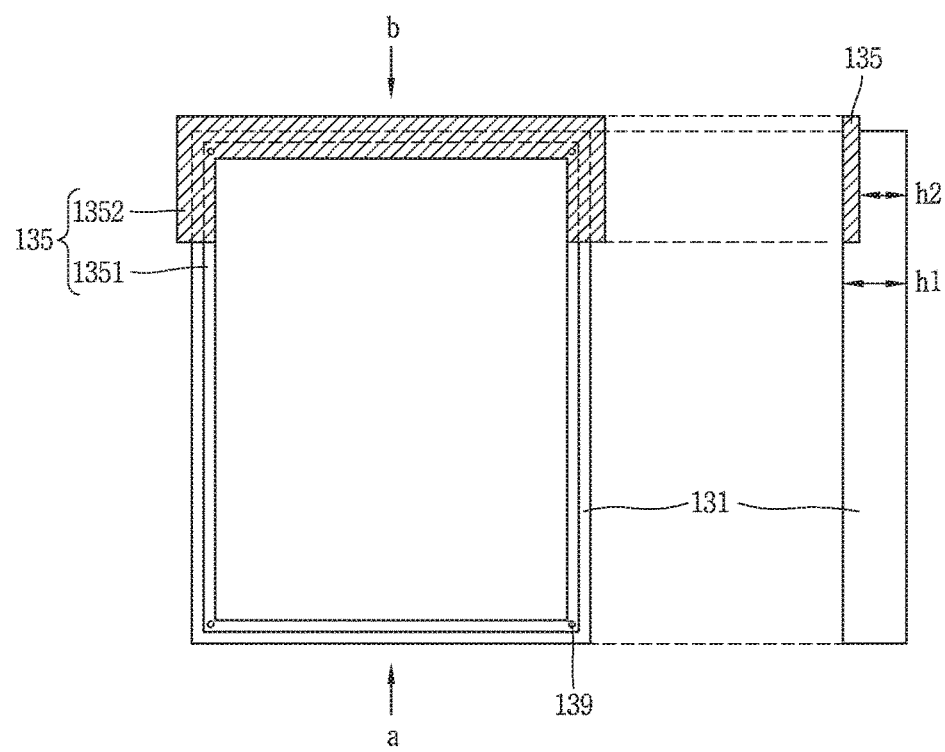
FIG. 5B illustrates a top plan view and side view of the cover bottom of FIG. 3.

Thus, referring to FIG. 5B, the cover bottom 131 may have a cuboid shape or box-shape with one open surface. In other words, the cover bottom 131 may include a bottom surface and four side surfaces. The side surfaces may adjoin the bottom surface at one edge thereof. Thus, the side surfaces may have one exposed edge, i.e. parallel or opposite to the one edge adjacent to the bottom surface. The side surfaces may extend to different heights from the bottom surface. Preferably, a height h2 of a side surface adjacent to a position of a non-display area of the liquid crystal panel 110 may be lower than a height h1 of a side surface adjacent to a position of a display area of the liquid crystal panel 110. Thus, two parallel side surfaces of the cover bottom 131 may have a stepped portion, respectively, wherein one portion of the respective side surface has the low height h2 and the remaining portion of the respective side surface has the high height h1.

The cover bottom 131 may be made of a metal material such as stainless alloy (e.g., SUS), aluminum (Al), etc., and manufactured by a metal press working technique. In the metal press working technique, a metal material to be worked is prepared in the form of a plate, and the metal material is pressed up, down, left, or right into a mold to shape it into the desired configuration. By this technique, each side of the cover bottom 131 supporting the rear side of the liquid crystal panel 110 may be formed as a curved shape, and can maintain such shape by the rigidity of the metal material even after the liquid crystal panel 110 is seated.

The cover bottom 131 need not be the same height on all sides. FIG. 5B illustrates a top plan view and side view of the cover bottom 131 of FIG. 3. Referring to FIG. 5B, a region of the cover bottom 131 applied with the adhesive 140 has a greater height than a region of the cover bottom 131 not applied with the adhesive 140. That is, the cover bottom 131 is not the same height on the four sides, but the side (a) applied with the adhesive 140 is higher in height than the other side (h1>h2). Thus, the rear side of the liquid crystal panel 110 is brought into direct contact with and supported by that region, and the liquid crystal panel 110 and the cover bottom 131 are fixed together in that region.

Additionally, the guide panel 135, which is to be described later, overlaps the side being lower in height than the other side, whereby the rear side of the liquid crystal panel 110, except the part connected to the flexible substrate 116, is supported.

With this configuration, the side edge of the liquid crystal panel 110 may be made as narrow as possible, thereby realizing a novel narrow bezel structure.

The guide panel 135 has preferably a shape of a rectangular frame. The guide panel may include a first portion 1351 and a second portion 1352. The first portion 1351 may have a rectangular frame shape, preferably with rectangular cross-section. Further, referring to FIG. 5A, the first portion 1351 may include a high part 1351*a* having a height ha and a low part 1351*b* having a height hb, wherein ha is larger than hb. The second portion 1352 may have uniform height. The second portion 1352 preferably has a squared bracket shape. The second portion 1352 may be attached to the low part 1351*b* of the first portion 1351. The second portion 1352 may extend over a portion of the side surfaces of the bottom cover 131 to an outside of the bottom cover 131. A width of the second portion 1352, i.e. in a direction parallel to a border line between the non-display area and the display area, correspond to a width of the liquid crystal display panel 110, i.e. of the lower substrate 111 thereof (see FIG. 7B). In an assembled state, the liquid crystal panel may rest on the high part 1351*a* of the first portion 1351 and on the second portion 1352 of the guide panel 135.

The guide panel 135 is supported the rear side edge of the optical sheet 125 of the backlight unit 120 above it. The guide panel 135 can be formed inside the cover bottom 131 by an injection molding technique, and can be made of a resin material. A plurality of injection holes 139 are formed in the bottom adjacent to edges and/or corners of the cover bottom 131, through which the resin material is injected to manufacture the guide panel 135 via the injection molding process. For example, four injection holes 139 may be formed, but the number of injection holes 193 may vary.

The portion of the guide panel 135 adjoining the lower-height side of the cover bottom 131 is made in a different color and structure corresponding to the shape of the side of the cover bottom 131 by means of double injection molding.

The guide panel 135 can be divided into a first portion 1351 and a second portion 1352. The first portion 1351 is formed at the bent portions of the four side edges of the cover bottom 131, at a height corresponding to the rear side of the optical sheet 125, and the second portion 1352 is formed in the region not applied with the adhesive 140, at a height corresponding to the rear side of the liquid crystal panel 110 and protrudes outward from the cover bottom 131 to a particular length. Also, the second portion 1352 is formed on the first injection-molded portion by double injection molding structure. A detailed description of an exemplary manufacturing method of the first and second portions 1351 and 1352 will be given later.

The first portion 1351 may be made of a white resin material and the second portion 1352 may be formed of a black resin material by double injection molding structure. Alternatively, both the first and second portions 1351 and 1352 may be made of a black resin material.

The liquid crystal panel 110 and the cover bottom 131 are not bonded with the adhesive 140 at the area covered by the second portion 1352, and this minimizes light leakage in that area.

According to the above-described configuration, the liquid crystal display device 100 including the guide panel according to the exemplary embodiment of the present disclosure has a narrow bezel structure formed by joining (adhering) the cover bottom 131 and the liquid crystal panel 110, and light is blocked by the second portion 1352 of the guide panel 135 in the area where the two components are not joined (adhered) together, leading to a reduction in light leakage.

Hereinafter, structures of a cover bottom and guide panel of a liquid crystal display device according to an exemplary embodiment of the present disclosure will be described in more detail.

Figure 6:
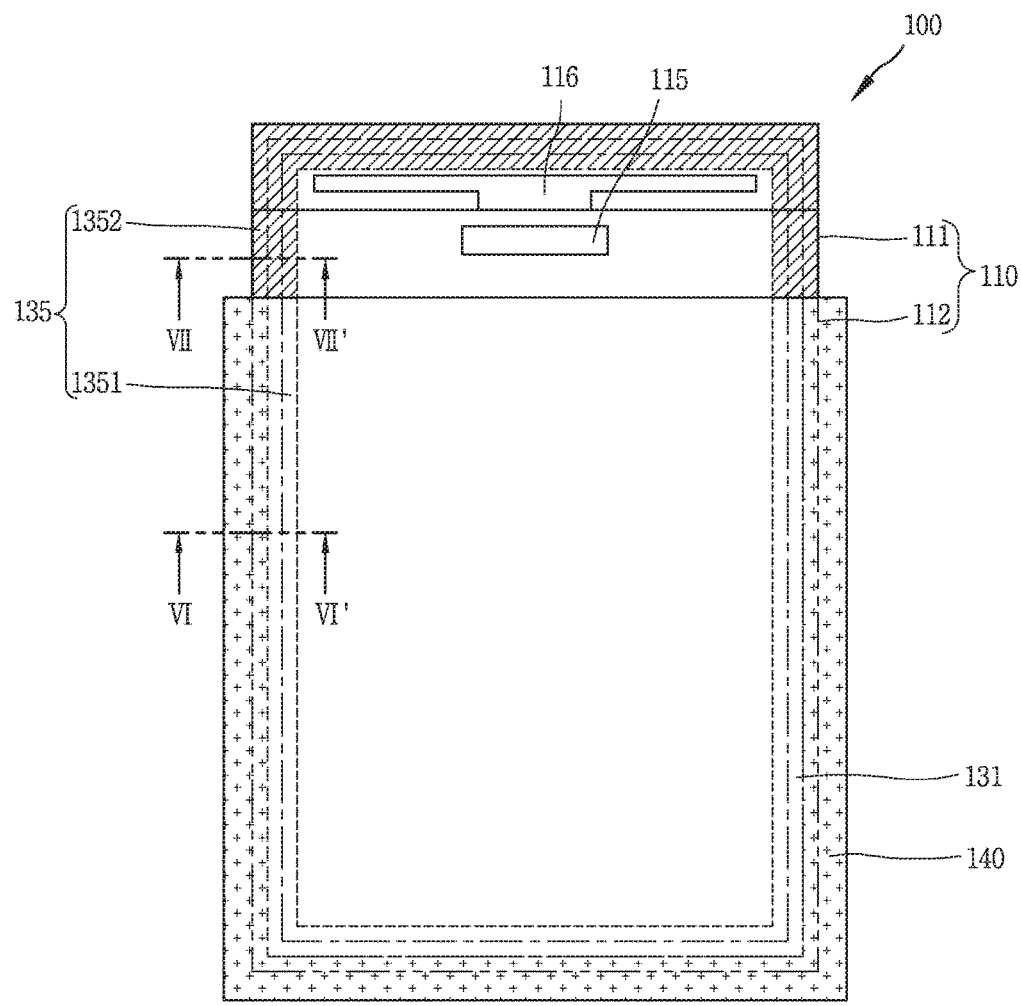
FIG. 6 is a top plan view of a liquid crystal display device according to an embodiment of the present invention.

FIG. 6 is a top plan view of a liquid crystal display device according to an exemplary embodiment of the present disclosure.

Referring to FIG. 6, the liquid crystal display device 100 includes a liquid crystal panel 110, a cover bottom 131 where the liquid crystal panel 110 is seated, and a guide panel 135 enclosing the side edge of a non-display area of the liquid crystal panel 110.

An upper polarizer 114, which is wider than an upper substrate 112, is bonded to the front of the upper substrate 112 of the liquid crystal panel 110, and each side of the cover bottom 131 adjoins the four side edges of the liquid crystal panel 110. Three sides of the cover bottom 131 are in contact with the rear side of the liquid crystal panel 110, and the other side encloses the flexible substrate 116.

Also, an adhesive 140 is applied to the remaining space of the upper polarizer 114, whereby the liquid crystal panel 110 and the cover bottom 131 are joined together in some parts.

Moreover, a guide panel 135, being wider than the cover bottom 131, is formed over the cover bottom 131, adjoining the non-display area at one side edge of the liquid crystal panel 110 to which a driving IC 115 and a flexible substrate 116 are connected.

The gap between the cover bottom 131 and the flexible substrate 116 is covered with light blocking tape or the like, thereby blocking light emitted from the inside.

The guide panel 135 includes a first portion 1351 provided in the form of a rectangular frame inside the cover bottom 131 and supporting a backlight unit, and a second portion 1352 protruding from the top of the first portion 1351 to the side edge of the non-display area of the liquid crystal panel 110. Accordingly, when viewed from the top, the second portion 1352 overlaps the underlying first portion 1351 and the side of the cover bottom 131, and protrudes to the side edge of the non-display area of the liquid crystal panel 110.

Figure 7A:
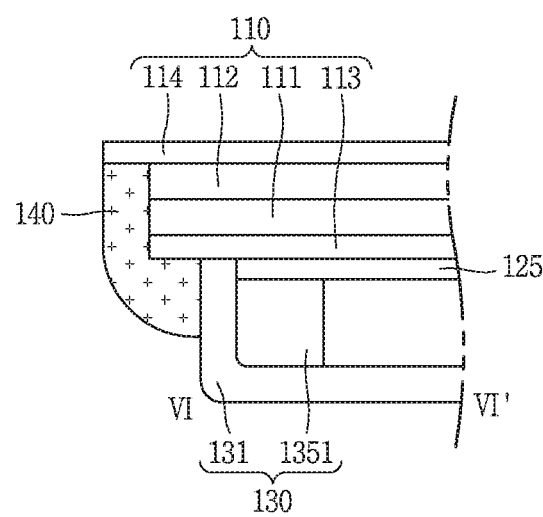
FIGS. 7A and 7B are respectively cross-sectional views taken along the line VI-VI' and line VII-VII' of FIG. 6.
Figure 7B:
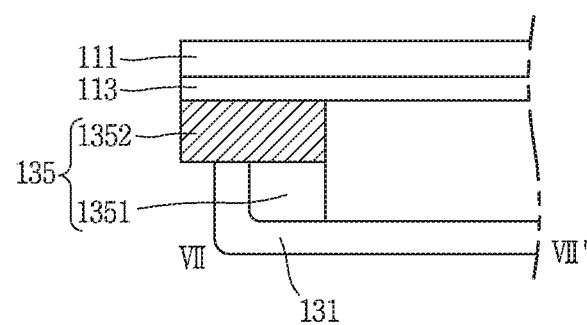

FIGS. 7A and 7B are respectively cross-sectional views taken along the line VI-VI' and line VII-VII' of FIG. 6. Referring to FIG. 7A, the rear side edge of a display area of the liquid crystal panel 110 is supported by the side of the cover bottom 131, and the first portion 1351 of the guide panel 135 inside the cover bottom 131 supports the optical sheet 125.

Also, the adhesive 140 is applied from the upper polarizer 114 across the lower and upper substrates 111 and 112 and the lower polarizer 113 and as far as the side of the cover bottom 131, thereby fixing the liquid crystal panel 110 and the cover bottom 131 together.

Referring to FIG. 7B, the rear side edge of the liquid crystal panel 110 corresponding to the non-display area is supported by the second portion 1352 of the guide panel 135 protruding outward from the cover bottom 131. The second portion 1352 is made of a black resin material, and blocks light emitted from the outside in an effective way.

The above-described guide panel 135 is manufactured by double injection-molding. A manufacturing method of a guide panel according to an exemplary embodiment of the present disclosure will be described below with reference to the drawings.

Figure 8A:
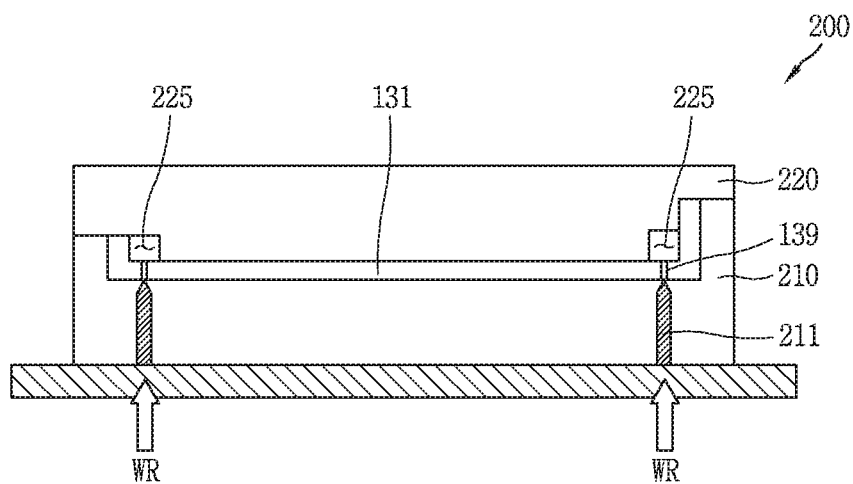
FIGS. 8A and 8B are pattern diagrams of a method of manufacturing a guide panel for a liquid crystal display device according to an embodiment of the present invention.
Figure 8B:
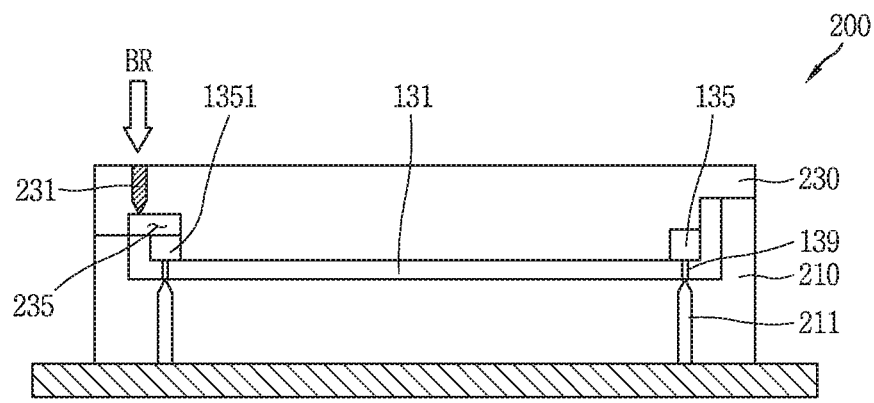

FIGS. 8A and 8B are diagrams of a method of manufacturing a guide panel for a liquid crystal display device according to an exemplary embodiment of the present disclosure.

Referring to FIGS. 8A and 8B, to manufacture a guide panel for a liquid crystal display device according to the exemplary embodiment of the present disclosure, a cover bottom 131 manufactured by metal press working is prepared 131, and an injection molding apparatus 200 including a lower core part 210 where the cover bottom 131 is seated, a first upper core part 220 for forming a first portion, and a second upper core part 230 for forming a second portion is prepared.

The cover bottom 131 used in the liquid crystal display device of this present disclosure is a curved metal plate with four sides and a bottom, and has particular injection holes 139 formed in the bottom adjoining the corners of the cover bottom 131.

The cover bottom 131 is seated inside the lower core part 210 of the injection molding apparatus 200, and injection openings 211 corresponding to the injection holes 139 are formed therein.

A first molding area 225 for forming the first portion of the guide panel is formed in the first upper core part 220, and a second molding area 235 for forming the second portion is formed in the second upper core part 230.

The method of manufacturing a guide panel by the injection molding apparatus 200 having this structure will be now be described. The cover bottom 131 is seated inside the lower core part 210 so that the injection holes 129 and the injection openings 211 come into contact with each other, and the first upper core part 220 and the lower core part 210 are joined together to seal the inside space of the injection molding apparatus 200. Next, a white resin material (WR) in a molten (or non-solidified) state is injected into the first molding area 225 through the injection openings 211, and then cooled down for a particular period of time, thereby forming the first portion.

Once the cooling process is completed, the first upper core part 220 is removed, and the second upper core part 230 is attached to the lower core part 210. Then, according to a double injection-molding technique, the black resin material (BR) in the molten (or non-solidified) state is injected into the second molding area 235 through an injection opening 231 formed in the second upper core part 230, and then cooled down, thereby forming the second portion.

Once the above process is completed, the cover bottom 131 is extruded or removed from the lower core part 210, thereby completing the guide panel for the liquid crystal display device using double injection molding on the cover bottom 131.

Although the description herein contains many specific examples and descriptions, these should not be construed as limiting the scope of the invention but as merely providing illustrations of some of the illustrated embodiments of the present disclosure. For example, thus the scope of the invention should be determined by the appended claims and their equivalents, rather than by the examples given.

What is claimed is:

1. A liquid crystal display device comprising:
   a liquid crystal panel including a display area and a non-display area;
   a cover bottom including a bottom surface and four side surfaces, at least one side surface of the four side surfaces having a lower height than other side surfaces; and
   a guide panel including a first portion and a second portion, the first portion formed of a first resin having a first color and provided within the cover bottom, and the second portion formed of a second resin having a second color different from the first color, and connected to the first portion,
   wherein the second portion overlaps on the one side surface of the cover bottom and extends over a portion of the one side surface to an outside of the cover bottom,
   wherein a part of the display area of the liquid crystal panel is supported by the other side surfaces of the cover bottom and at least part of the non-display area of the liquid crystal panel is supported by the second portion of the guide panel, and
   wherein a height from the bottom surface of the cover bottom to the second portion of the guide panel is substantially equal to a height of the other side surfaces of the cover bottom.

2. The liquid crystal display device according to claim 1, wherein the liquid crystal panel includes a first substrate and a second substrate, the first substrate including the non-display area which is exposed by the second substrate.

3. The liquid crystal display device according to claim 2, wherein the liquid crystal panel includes an upper polarizer attached to the second substrate, the upper polarizer extending over at least one edge of the second substrate at a circumferential portion of the liquid crystal panel.

4. The liquid crystal display device according to claim 1, wherein a circumferential portion of the liquid crystal panel adjacent to the display area is attached to the cover bottom by an adhesive configured to block light.

5. The liquid crystal display device according to claim 1, further including a backlight unit mounted within the cover bottom, wherein a part of the backlight unit is supported by the first portion of the guide panel.

6. The liquid crystal display device according to claim 1, wherein the first portion of the guide panel has a rectangular frame shape.

7. The liquid crystal display device according to claim 1, wherein the first portion of the guide panel includes an upper part having a first height and a low part having a second height, the first height being higher than the second height.

8. The liquid crystal display device according to claim 1, wherein the second portion of the guide panel has a squared bracket shape.

9. The liquid crystal display device according to claim 1, wherein the second portion of the guide panel is configured to block light.

10. The liquid crystal display device according to claim 1, wherein the cover bottom has injection holes formed in the bottom surface thereof corresponding to a position of the first portion of the guide panel.

11. A method for manufacturing a liquid crystal display device, comprising:
forming a guide panel including a first portion and a second portion, the first portion formed of a first resin having a first color and provided within a cover bottom, and the second portion formed of a second resin having a second color different from the first color, and connected to the first portion; and
mounting a liquid crystal panel into the guide panel, the liquid crystal panel including a display area and a non-display area,
wherein the cover bottom includes a bottom surface and four side surfaces, at least one side surface of the four side surfaces having a lower height than other side surfaces,
wherein the second portion of the guide panel overlaps on the one side surface of the cover bottom and extends over a portion of the one side surface to an outside of the cover bottom,
wherein a part of the display area of the liquid crystal panel is supported by the side surfaces of the cover bottom and at least part of the non-display area of the liquid crystal panel is supported by the second portion of the guide panel, and
wherein a height from the bottom surface of the cover bottom to the second portion of the guide panel is substantially equal to a height of the other side surfaces of the cover bottom.

12. The method according claim 11, wherein the first portion of the guide panel is formed by injecting the first resin through injection holes in the bottom surface of the cover bottom.

13. The method according claim 11, wherein the forming the first portion and the second portion of the guide panel includes forming the first portion by injecting the first resin through injection holes in the bottom surface of the cover bottom, and forming the second portion by injecting the second resin through injection openings in the bottom surface of the cover bottom using a double injection molding process.

14. The method according claim 11, wherein the first resin includes a white resin and the second resin includes a black resin.

15. The method according claim 11, wherein the second portion of the guide panel is configured to block light.

16. The liquid crystal display device according to claim 1, wherein the first resin includes a white resin and the second resin includes a black resin.

* * * * *